(12) United States Patent
Morgensai (10) Patent No.: US 7,104,912 B2
(45) Date of Patent: Sep. 12, 2006

(54) DIFFERENTIAL GEAR MECHANISM AND IMPROVED AXLE RETENTION ARRANGEMENT THEREFOR

(75) Inventor: Keith E. Morgensai, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 215 days.

(21) Appl. No.: 10/896,463

(22) Filed: Jul. 21, 2004

(65) Prior Publication Data

US 2006/0019788 A1    Jan. 26, 2006

(51) Int. Cl.
*F16H 48/06*    (2006.01)
*F16H 48/30*    (2006.01)

(52) U.S. Cl. ........................... 475/231; 475/88

(58) Field of Classification Search .......... 475/231, 475/232, 346, 347, 86, 88
See application file for complete search history.

(56) References Cited

U.S. PATENT DOCUMENTS

| | | | |
|---|---|---|---|
| 5,149,309 A | * | 9/1992 | Guimbretiere .............. 475/234 |
| 5,215,506 A | | 6/1993 | Hara ............................ 475/86 |
| 5,310,388 A | | 5/1994 | Okcuoglu et al. ............ 475/88 |
| 5,924,948 A | * | 7/1999 | Kwoka ......................... 475/88 |
| 5,938,555 A | * | 8/1999 | Leeper ......................... 475/88 |
| 6,014,916 A | * | 1/2000 | Tyson ........................ 475/230 |
| 6,413,182 B1 | * | 7/2002 | Yates III et al. ............... 475/86 |
| 6,733,411 B1 | * | 5/2004 | Kaplan et al. ................. 475/88 |

* cited by examiner

*Primary Examiner*—Robert Pang
(74) *Attorney, Agent, or Firm*—Bradley J. Dieorich; K. J. Kasper (57) ABSTRACT

A differential gear mechanism (11) and improved axle shaft (53) retention arrangement for the axle shaft. The mechanism includes a side gear (27) defining first internal splines, a coupling (35) defining second internal splines (35S), and a rotor (49) of a gerotor pump defining third internal splines (49S). The axle shaft includes external splines (55), an annular groove (57), and a collapsible and expandable retention ring (59) within the groove. The assembly operator aligns the external splines with the third internal splines (49S), then with the second internal splines (35S), and finally, with the first internal splines (27S), before exerting force ("F" in FIG. 3) on the axle shaft to collapse the retention ring by passing it through the third internal splines (49S) until the ring can expand (FIG. 4). The axle shaft is retained as the retention ring engages an inboard end (69) of the third internal splines.

10 Claims, 5 Drawing Sheets

DIFFERENTIAL GEAR MECHANISM AND IMPROVED AXLE RETENTION ARRANGEMENT THEREFOR

BACKGROUND OF THE DISCLOSURE

The present invention relates to limited slip and locking type differential gear mechanisms, and more particularly, to such differential gear mechanisms which include some sort of clutch arrangement for limiting or preventing (under certain, predetermined conditions) differentiation within the device.

As used herein, the term "differential gear mechanism" will be used to mean and include a device which is able to transmit torque from an input to one or more outputs, and in which there is a clutch assembly-disposed between the input and the output, such that the amount of torque transmitted is a function of the extent of engagement of the clutch assembly. Within the scope of the present invention, the term "limited slip" will be used in regard to such differential gear mechanisms, and should be understood to mean and include both limited slip and locking differentials.

Although the axle retention arrangement of the present invention may be utilized with many different types and configurations of limited slip differential gear mechanisms, it is especially suited to, and necessary for, differential gear mechanisms of the type illustrated and described in U.S. Pat. No. 5,310,388, assigned to the assignee of the present invention and incorporated herein by reference. In the limited slip differential gear mechanism of the cited patent, there is a clutch pack operable to transmit torque between the input (ring gear and differential case) and the output (one of the side gears and its respective axle shaft), with the degree of engagement of the clutch pack being determined by the fluid pressure in a clutch piston chamber. The fluid pressure biases a clutch piston toward greater engagement of the clutch pack. The differential gear mechanism of the cited patent also includes a gerotor pump having one rotor fixed to rotate with the input and the other rotor fixed to rotate with the output (specifically, the axle shaft), such that the flow of pressurized fluid into the clutch piston chamber is generally proportional to the speed difference between the input and the output.

As is well known to those skilled in the differential art, each of the outputs (axle shafts) typically defines a set of external splines in splined engagement with a set of internal splines defined by the respective side gear of the differential gear set. In limited slip differential gear mechanisms of the type illustrated in the above-incorporated patent, the external splines of the axle shaft are also in splined engagement with the internal splines defined by the clutch coupling member (to which the inner clutch disks are splined), and are also in splined engagement with the inner rotor of the gerotor pump. The necessity of having the external splines of the axle shaft in splined engagement with three separate sets of internal splines makes it much more difficult to achieve the required axle retention, and in particular, to retain the axle shaft in such a way that, when necessary, the axle shaft can later be removed for service and maintenance.

In the differential gear mechanism of the above cited patent, it is not feasible to utilize a retention ring disposed about the axially inner end of the axle shaft, i.e., inboard of the side gear. In the subject embodiment of the present invention, there is no access to that portion of the differential gear mechanism through the conventional "window" in the case, because the member which serves as the "cover" for the outer differential housing is a structural member. Therefore, in order to get access to the location just inboard of the side gears, to insert or remove a retention ring, the entire axle assembly would have to be removed from the vehicle, to be able to remove the "cover".

As is well known to those skilled in the art of differential assembly, installation of the externally splined axle shaft within the differential gear mechanism typically involves one or more steps in which the assembly operator rotates the axle shaft to achieve rotational alignment of the external splines with the mating internal splines of, for example, the respective side gear. If the axle shaft is to be retained within the differential gear mechanism by some sort of collapsible and expandable retention ring, the assembly operator will, at some point during the installation of the axle shaft, have to exert sufficient force on the axle shaft, in an axially inboard direction, to compress the retention ring, then move the axle shaft further axially inward to a position where the retention ring is then allowed to expand, and serve its function of retaining the axle shaft, i.e., to prevent movement axially in an outboard direction.

Typically, the process of rotating the axle shaft to achieve rotational alignment of the external and internal splines is done by the assembly operator, manually, whereas the step of applying sufficient axial force on the axle shaft to collapse the retention ring is achieved with the help of a piece of equipment such as a hydraulic or pneumatic cylinder. Thus, in those situations, it is not considered acceptable practice at the typical axle assembly plant for the differential manufacturer to provide an axle retention arrangement which requires rotation of the axle shaft (to align the splines) and, at the same time, pushing the axle shaft (axially, to collapse the retention ring).

BRIEF SUMMARY OF THE INVENTION

Accordingly, it is an object of the present invention to provide a differential gear mechanism having an improved axle retention arrangement which overcomes the problems associated with the prior art.

It is a more specific object of the present invention to provide such an improved axle retention arrangement for use in a limited slip differential gear mechanism in which the externally splined axle shaft is in engagement with at least two separate sets of internal splines.

It is a further object of the present invention to provide such an improved axle retention arrangement in which all of the steps of rotating the axle shaft to align the splines are completed prior to the step of exerting the force necessary to collapse the retention ring.

The above and other objects of the invention are accomplished by an improved differential gear mechanism including a gear case defining an axis of rotation and a gear chamber, and differential gearing disposed in the gear chamber, including at least one input gear and an output gear adapted to drive an axle shaft. The mechanism includes means operable to limit rotation of the output gear relative to the gear case, the means operable to limit rotation comprising a clutch housing, fixed relative to the gear case, and a coupling means disposed adjacent the output gear and disposed to be concentric about the axis of rotation. The means operable to limit rotation further comprises a clutch pack including at least one outer friction disc, fixed to rotate with the clutch housing, and at least one inner friction disc fixed to rotate with the coupling means. A fluid pump is disposed axially outboard of the clutch pack and comprises an inner rotor adapted to be driven by the axle shaft. The output gear defines a first set of internal splines, and the inner rotor defines a second set of internal splines, and the axle shaft defines a mating set of external splines.

The improved differential gear mechanism is characterized by the axle shaft defining an annular groove, and a retention ring is disposed within the annular groove. The annular groove and the retention ring are disposed at an axial location on the axle shaft such that, during insertion of the axle shaft, the set of external splines passes through the second set of internal splines, and passes into engagement with the first set of internal splines before the retention ring engages the second set of internal splines, and is collapsed radially inwardly by passing through the second set of internal splines. The retention ring is permitted to expand radially outward as it exits the second set of internal splines, the retention ring remaining disposed immediately inboard of the second set of internal splines to prevent movement, except in response to at least a predetermined axial force of the axle shaft in an outboard direction.

DETAILED DESCRIPTION OF THE PREFERRED EMBODIMENT

Figure 1:
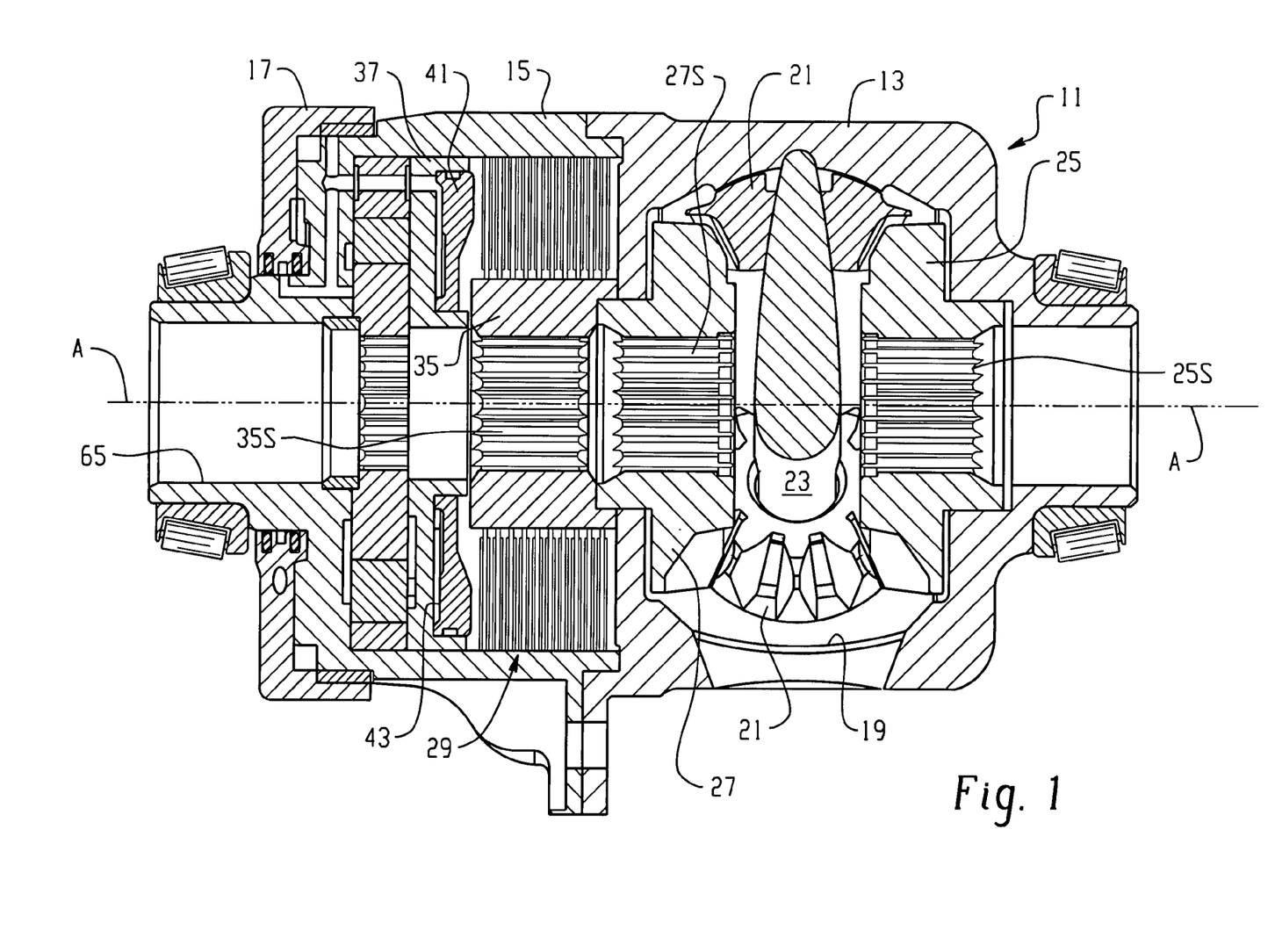
FIG. 1 is an axial cross-section of a vehicle differential gear mechanism of the general type with which the present invention may be utilized.

Referring now to the drawings, which are not intended to limit the invention, FIG. 1 illustrates a limited slip differential gear mechanism (coupling device), generally designated 11, for use in a vehicle drive line, and which is of the general type illustrated and described in the above-incorporated patent, and which is especially well suited for use in connection with the axle retention arrangement of the present invention. The differential gear mechanism 11 comprises a housing, including a gear housing 13, a clutch housing 15, and a valve housing 17, held together by any suitable means, as is now well known in the art.

Referring still to FIG. 1, the gear housing 13 defines a gear chamber 19, and disposed therein, but by way of example only, there may be provided a typical differential gear set. In the subject embodiment, there is included a pair of input pinion gears 21 (one in plan view and one in cross-section), rotatably mounted relative to a pinion shaft 23, the pinion gears 21 being in toothed engagement with a pair of side gears 25 and 27. In the subject embodiment, and again by way of example only, the input pinion gears 21 (along with the housings 13 and 15) may be considered the "input" to the differential gear mechanism 11, while the side gears 25 and 27 comprises the "outputs" of the mechanism 11. More specifically, for purposes of most of the subsequent description, the side gear 27 will be considered to comprise the "output" of the differential mechanism 11. Also, for purposes of subsequent description, the pinion shaft is considered the "center" of the mechanism, and for example, the side gear 27 is considered "outboard" relative thereto.

The side gears 25 and 27 define sets of straight, internal splines 25S and 27S, respectively, which are adapted to receive right and left axle shafts (not shown in FIG. 1), whereby the mechanism 11 transmits torque by means of the axle shafts to associated vehicle drive wheels (also not shown). It should be clearly understood, however, that the structure described hereinabove is by way of example only, and the axle retention arrangement of the present invention may also be used with various other types of differential gear structures and configurations.

Figure 2:
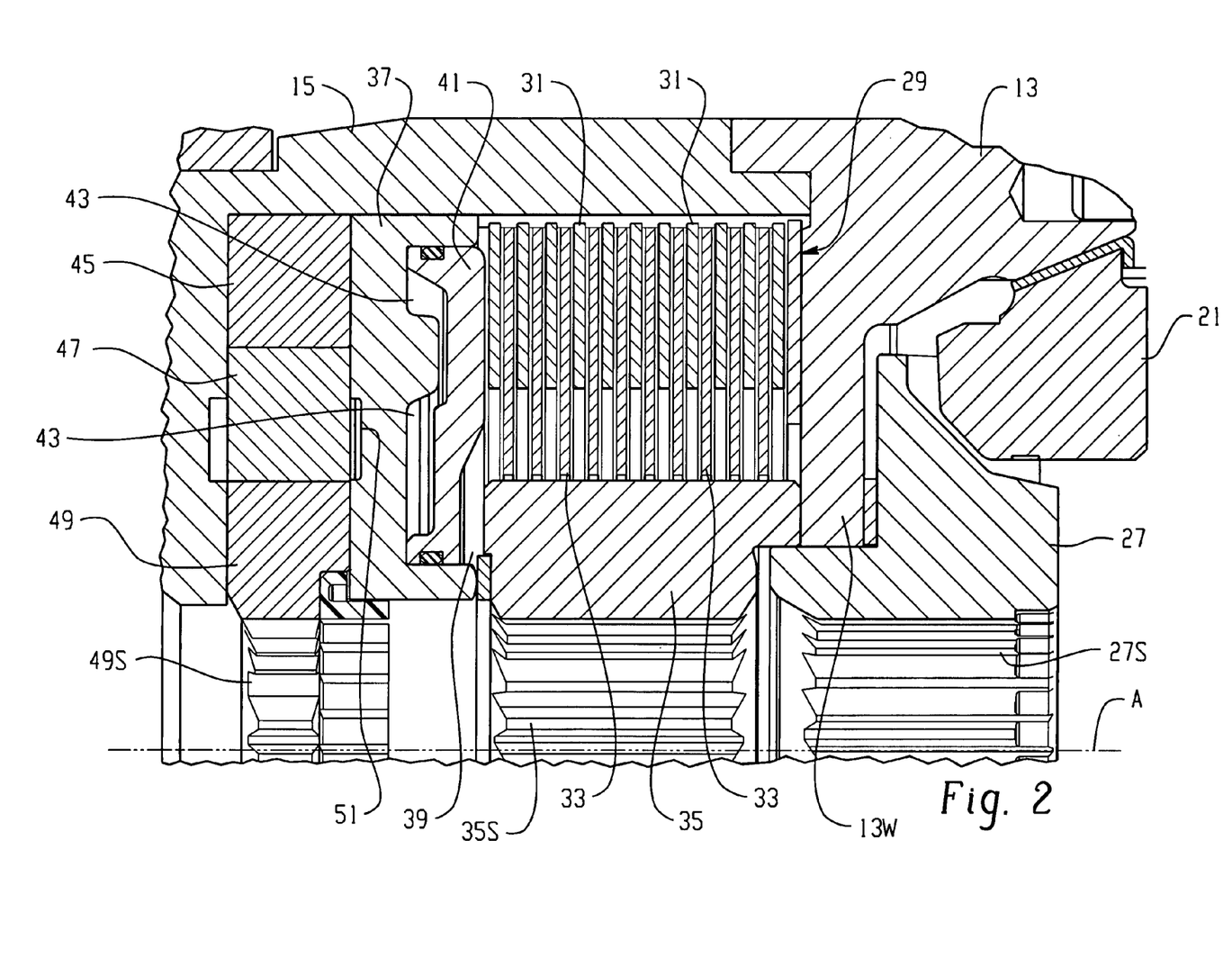
FIG. 2 is an enlarged, fragmentary, axial cross-section, similar to FIG. 1, illustrating in greater detail that portion of the differential gear mechanism with which the axle retention arrangement of the present invention is most closely associated.

Referring still primarily to FIG. 1, there is disposed within the clutch housing 15 a clutch pack, generally designated 29 which, as is shown in greater detail in FIG. 2, comprises a plurality of outer discs 31 which are in splined engagement with a set of internal splines defined by the clutch housing 15. In addition, the clutch pack 29 includes a plurality of inner discs 33, which are interleaved with the outer discs 31 in a well known manner, the inner discs 33 being in splined engagement with a coupling member 35. The coupling member 35 defines a set of internal splines 35S, which are also in splined engagement with the left axle shaft, such that the coupling member 35 is fixed, in the subject embodiment, to rotate with the side gear 27. However, it should be understood that the present invention is not limited to differential gear mechanisms in which there is a coupling member 35 separate from the adjacent side gear 27, but instead, the inner discs 33 could be splined to a hub portion formed integrally with the side gear 27.

Also disposed within the clutch housing 15 is an annular housing insert 37 which cooperates with the adjacent coupling member 35, and with the clutch pack 29, to define a clutch cavity or clutch piston chamber 39 (the reference numeral "39" appearing only in FIG. 2). Disposed within the clutch piston chamber 39, and moveable axially therein, is a clutch piston 41 which cooperates with the housing insert 37 to define a piston pressure chamber 43, which may best be seen in FIG. 2. As is well known to those skilled in the art of such devices, variations in the fluid pressure in the piston pressure chamber 43 will result in variations in the axial force applied by the clutch piston 41 to the clutch pack 29 and therefore, will result in variations in the "bias torque", i.e., the torque transmitted through the clutch pack from the input of the gear mechanism 11 to the output.

Referring now primarily to FIG. 2, it should be noted that the mechanism shown in FIG. 2 is not identical in all details to that in FIG. 1, but is substantially identical for purposes of explaining the present invention. Also disposed within the clutch housing 15, and immediately to the left of the housing insert 37, is a gerotor gear set comprising a stationary, eccentric member 45, an internally-toothed outer rotor 47, and an externally-toothed inner rotor 49. The inner rotor 49 defines a set of straight, internal splines 49S which are also meant to be in engagement with the left axle shaft, as described previously, such that the inner rotor 49 is fixed to rotate with the coupling member 35 and the side gear 27. As is now well known to those skilled in the art of such devices, during normal, straight-ahead operation, the entire differential coupling 11 rotates as a unit, i.e., the housings 13 and 15 and the side gears 25 and 27 and the axle shafts all rotate at the same rotational speed. In that condition, there is no relative rotation between the outer rotor 47 and the inner rotor 49, and therefore, there is no pumping of pressurized fluid from the volume chambers (formed between the teeth of the rotors 47 and 49, when they are rotating).

As is also well known to those skilled in the art, based in part upon the teachings of the above-incorporated patent, when there is differentiation, i.e., when there is a difference in the speed of rotation between the left and right axle shafts, there will also, of necessity, be a speed difference between the input (housings 13 and 15 and pinion gears 21) and the output (the left axle shaft). That speed difference between the input and the output will result in the rotation of the left axle shaft driving the inner rotor 49 which, in turn, will drive the outer rotor 47, thus pumping pressurized fluid into an output chamber 51 (the reference numeral "51" appearing only in FIG. 2), from where the pressurized fluid is communicated through an appropriate fluid port (not shown herein) in the housing insert 37, such that the pressurized fluid is communicated into the piston pressure chamber 43. However, it should be understood that the present invention is not limited to a differential gear mechanism including an "on-board" gerotor pump, but instead, could be used in a system in which there is a separate source of pressurized fluid.

The housing insert 37 cooperates with the eccentric member 45 and the clutch housing 15 to define an axial fluid passage (not shown herein) which is in open communication with the piston pressure chamber 43. The clutch housing 15 defines a radial fluid passage (also not shown herein), which intersects the axial passage and, eventually, is in fluid communication with the inlet of a pressure control valve assembly which is effective to control the fluid pressure in the piston pressure chamber 43. The construction and functioning of the pressure control arrangement, and the associated fluid passages, are illustrated and described in greater detail in co-pending application U.S. Ser. No. 10/795,651, filed Mar. 8, 2004, in the name of Christopher J. Babin, for a "Coupling Device and Improved Method of Controlling Torque Transmission", assigned to the assignee of the present invention, and incorporated herein by reference. Those skilled in the art will understand that the fluid path and the pressure control arrangement of the above-incorporated patent are not essential features of the present invention.

Figure 3:
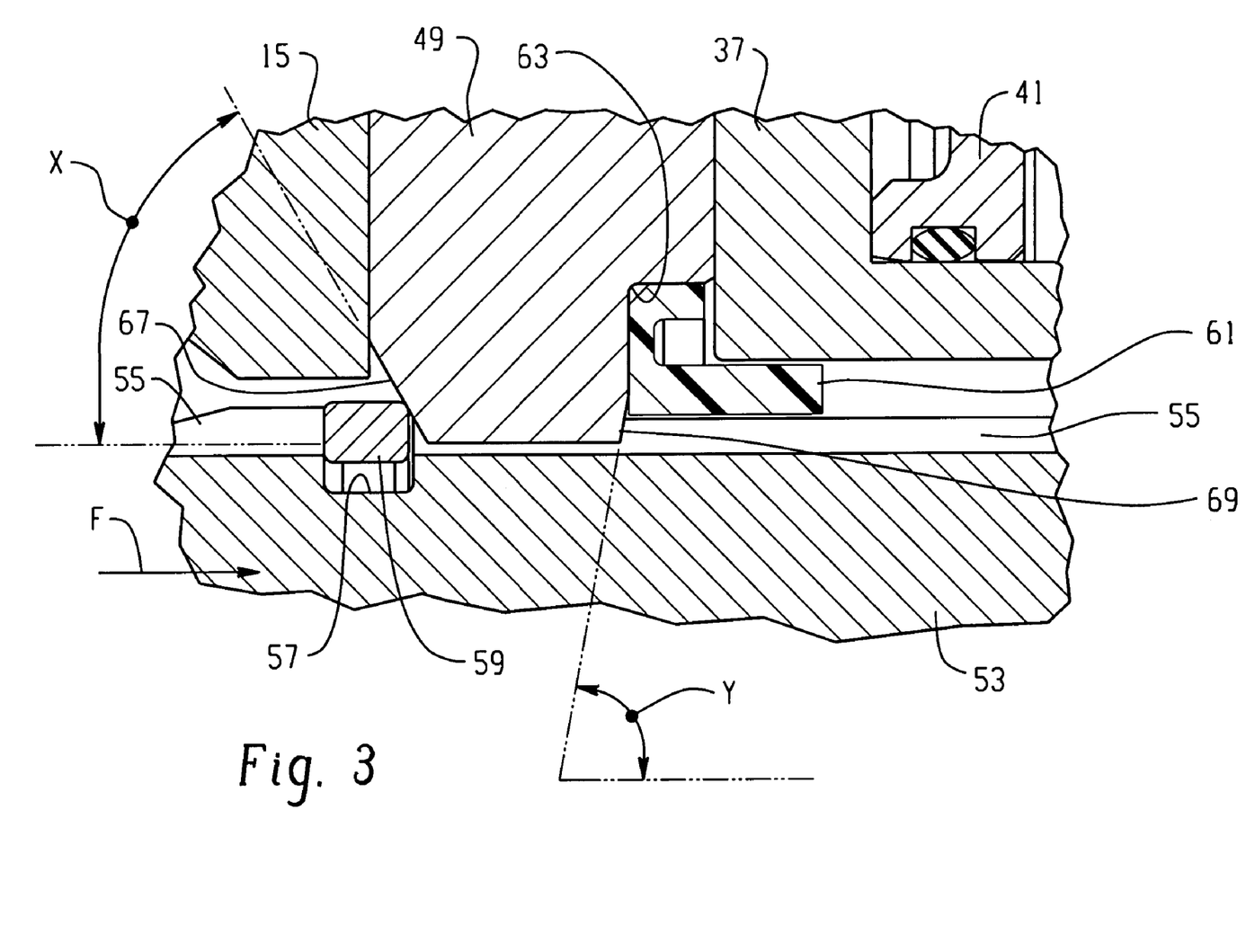
FIG. 3 is a further enlarged, fragmentary, axial cross-section, similar to FIG. 2, but now with the axle shaft partially inserted.

Referring now primarily to FIG. 3, but in conjunction with FIG. 2, it is typically in the axle assembly plant where the differential gear mechanism 11 is installed within an outer differential housing (not shown herein), that the axle shafts are inserted, it being understood that the right axle shaft (the one which would engage the internal splines 25S) is not shown herein. However, in FIG. 3, there is shown a left axle shaft 53 which defines a set of external splines 55.

Figure 3A:
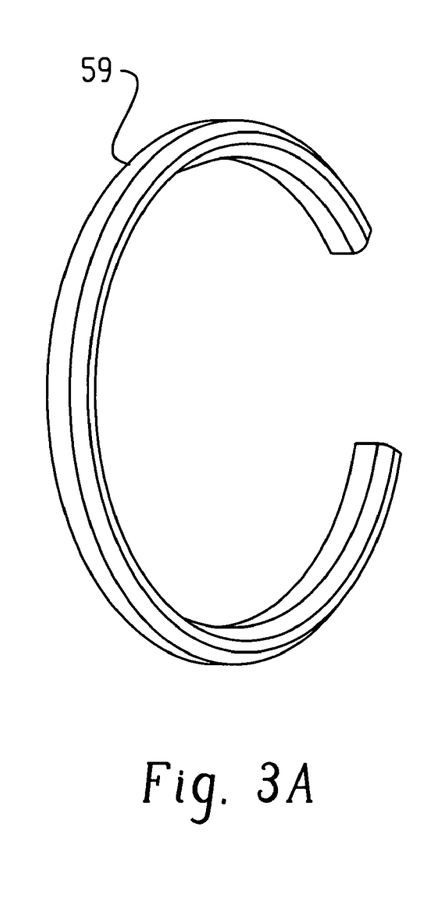
FIGS. 3A, 3B and 3C are various views of the retention ring which comprises one aspect of the present invention, including a perspective view, a front plan view, and an axial cross-section, taken on line C—C of FIG. 3B, respectively.
Figure 3B:
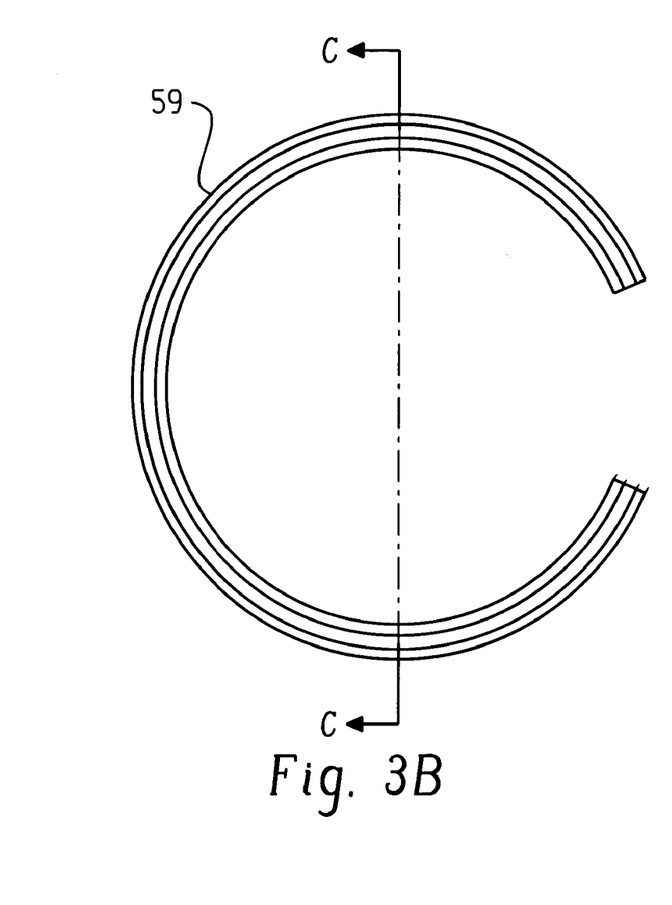
Figure 3C:
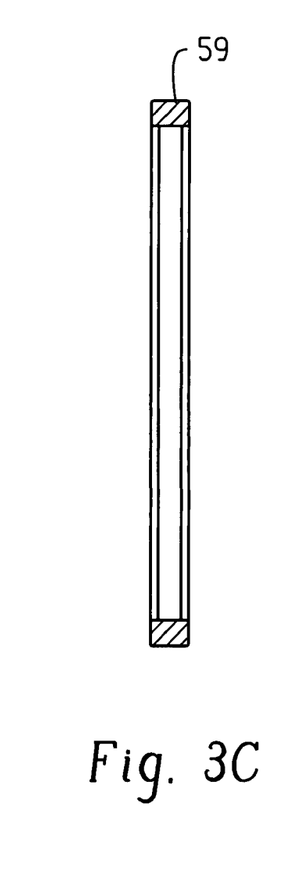

The left axle shaft 53 defines an annular groove 57, and as is best shown in FIG. 3, disposed within the annular groove 57 is a retention ring 59. As is well known to those skilled in the art, the retention ring 59 can take a number of different forms and configurations, all of which are included as part of the present invention, except to the extent the appended claims exclude any such form or configuration. Typically, the retention ring 59 would be formed from a spring steel, such that it is normally "biased" radially outward to the position shown in FIG. 3, and FIGS. 3A and 3B (the "expanded" position), in the absence of some sort of constraint or force which would "compress" (or "collapse") the retention ring 59, and force it to be wholly disposed within the annular groove 57. As will be appreciated from the subsequent description of the invention, the retention ring 59 must be disposed axially "intermediate" the external splines 55, i.e., a portion of the external splines 55 is disposed axially inboard of the retention ring 59, and a portion of the external splines 55 is disposed "outboard" of the retention ring 59, i.e., axially further from the "center" (the pinion shaft 23) of the mechanism 11 toward the drive wheel. By way of contrast, "inboard" would be understood to mean and include movement in an axial direction toward the center of the mechanism 11.

Although not an essential feature of the present invention, the subject embodiment includes an alignment ring 61, which would typically be an annular molded plastic member. The "in-board" side of the inner rotor 49 defines an annular recess 63, with the alignment ring 61 being disposed therein. As will be understood by those skilled in the art of the types of differential gear mechanisms illustrated and described in the above-incorporated patent, the primary function of the alignment ring 61 is to maintain the inner rotor 49 in its properly "centered" position, which is important in preparation for inserting the external splines 55 of the axle shaft 53 in engagement with the internal splines 49S of the inner rotor 49.

During the insertion of the left axle shaft 53, the assembly operator will first begin to insert the axle shaft 53 into and through a hub portion 65 (see FIG. 1) defined by the clutch housing 15. When a leading end (not shown herein) of the external splines 55 engages an outboard end 67 (left end, see FIG. 4) of the internal splines 49S, the assembly operator rotates the axle shaft 53 until the external splines 55 are properly aligned with, and can begin to pass through the internal splines 49S. When the leading end of the external splines 55 engages an outboard end of the internal splines 35S of the coupling member 35, the assembly operator will again rotate the axle shaft 53 (and the inner rotor 49 will rotate with the axle shaft 53) until the external splines 55 are properly aligned with the internal splines 35S and can begin to pass through the internal splines 35S.

Finally, as the assembly operator continues to move the axle shaft 53 in an inboard direct (to the right in all of FIGS. 1 through 4), the leading end of the external splines 55 will engage an outboard end of the internal splines 27S. The assembly operator will rotate the axle shaft 53 (with the inner rotor 49 and coupling member 35 rotating with the axle shaft 53), until the external splines 55 are properly aligned with the internal splines 27S and can begin to pass through the internal splines 27S, permitting the axle shaft 53 to continue to be moved in an inboard direction. When the leading end of the external splines 55 has passed partially through (approximately halfway through, by way of example only) the internal splines 27S, the axle shaft 53 will be in the position shown in FIG. 3, at which point the retention ring 59 (still in its expanded condition) engages the outboard end 67 of the internal splines 49S.

In accordance with one important aspect of the present invention, the assembly operator has already performed all of the necessary steps of rotating the axle shaft 53 to achieve proper alignment rotationally of the external splines 55 with the various sets of internal splines (49S, 35S, or 27S). With all of the external spline-internal spline engagements having been achieved, it is now acceptable for the assembly operator to apply a substantial axial force, in an inboard direction, on the axle shaft 53 (see arrow designated "F" in FIG. 3), sufficient to compress the retention ring 59, causing it to collapse into the annular groove 57 such that, in the collapsed position, the outer diameter of the retention ring 59 is now approximately equal to the tip diameter of the internal splines 49S. In order to help achieve this collapse of the retention ring 59, it may be seen that the outboard end 67 of the internal splines 49S is disposed at an angle "X", which is selected such that the available axial force which can be applied to the axle shaft 53 (typically, by means of a hydraulic or pneumatic cylinder, as mentioned previously) is sufficient to collapse the retention ring 59 into the annular groove 57, as the axle shaft moves to the right, from the position shown in FIG. 3, causing the forward outer corner of the retention ring 59 to slide down the surface 67.

Figure 4:
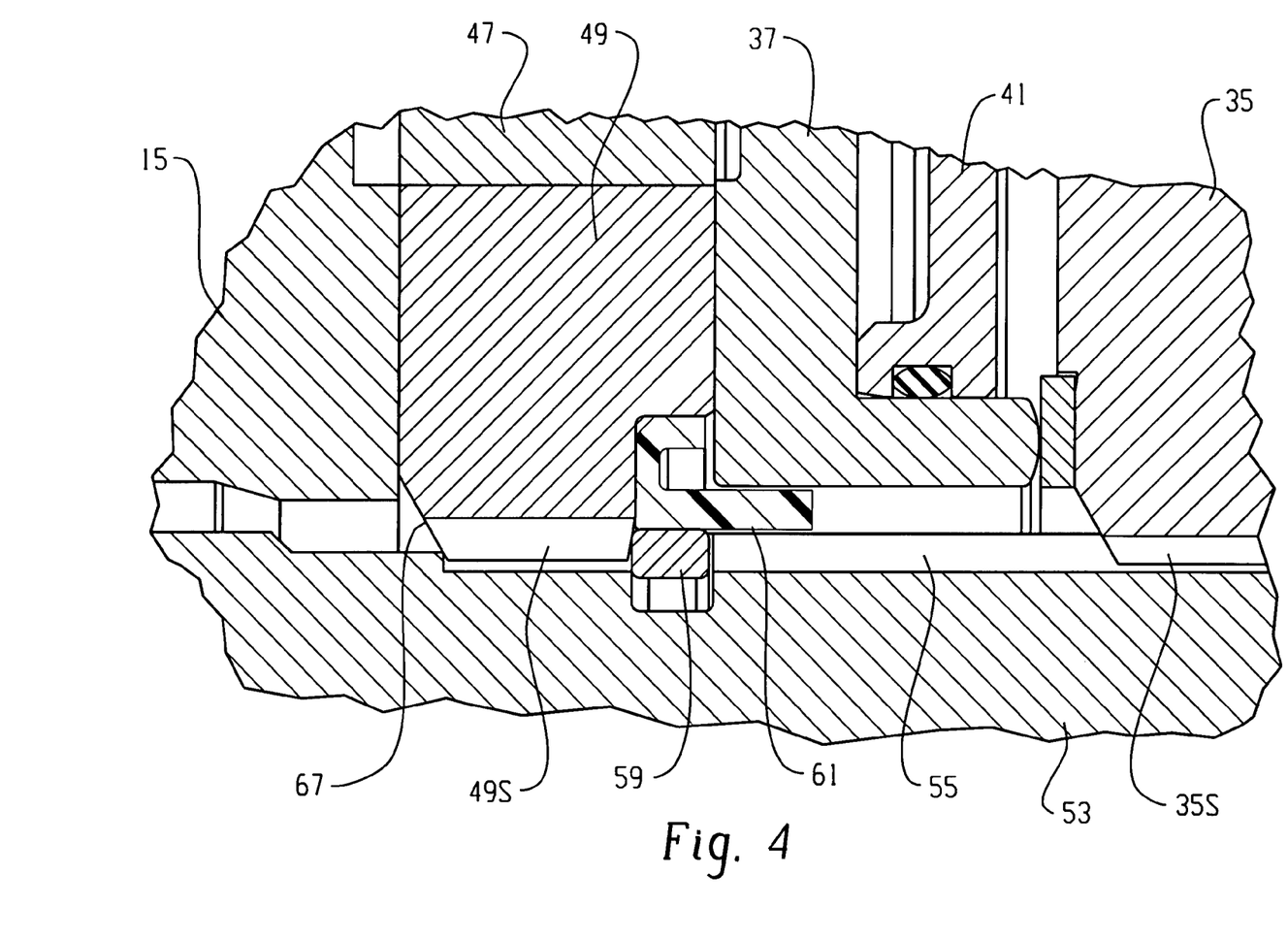
FIG. 4 is an enlarged, fragmentary, axial cross-section, on a slightly smaller scale than FIG. 3, but now with the axle shaft in its fully inserted position.

Referring now primarily to FIG. 4, once the axle shaft 53 has been inserted, axially, to the point that the retention ring 59 is past the internal splines 49S, the retention ring 59 will expand to the condition shown in FIG. 4. One advantage of the presence of the alignment ring 61 is that the expanding retention ring 59 will engage the inside diameter of the alignment ring 61, and thereafter, the axle shaft 53 is "retained", i.e., it cannot move much further inboard because the axle shaft 53 would engage the pinion shaft 23, and it cannot move in an outboard direction because of the engagement of the expanded retention ring 59 with an inboard end 69 of the internal splines 49S. As may best be seen in FIG. 3, the inboard end 69 of the internal splines 49S defines an angle "Y", relative to the axis of rotation A.

Preferably, the angle Y on the inboard end 69 of the internal splines (see FIG. 3) is somewhat "steeper" (i.e., forms a greater angle with the axis of rotation A) than is the angle X of the outboard end 67 of the internal splines 49S. Therefore, while a certain predetermined axial force is required to overcome the angle X during assembly and compress, or collapse, the retention ring 59, a somewhat greater (or perhaps substantially greater) force would be required to move the axle shaft 53 from the assembled position shown in FIG. 4, overcoming the angle Y and compressing the retention ring 59 enough to move the axle shaft 53 in an outboard direction, to a disassembled condition. Preferably, the angle Y is selected such that "disassembly" of the axle shaft 53 cannot occur under normal operating conditions, but in the event that service or maintenance is required, an appropriate piece of equipment may be used to exert sufficient force to remove the axle shaft, in preparation for such service.

Therefore, although the present invention has been illustrated and described in connection with a differential gear mechanism 11 in which there are three sets of internal splines 27S, 35S and 49S, it should be understood by those skilled in the art that such is not a limitation of the invention. Thus, as is set forth in certain of the appended claims, the improved axle retention arrangement of the invention could be utilized in a mechanism having internal splines on only the side gear 27 and a clutch coupling member 35, in which case, the internal splines 35S within the coupling member 35 would comprise the "second set of internal splines". Alternatively, the improved axle retention arrangement of the invention could be utilized in a mechanism having internal splines on only the side gear 27 and the inner rotor 49 of a fluid pump, in which case, the internal splines 49S within the inner rotor would comprise the "second set of internal splines". Of course, if there is a side gear, a coupling member, and an inner rotor, then the respective internal splines would comprise the "first", "second", and "third" internal splines, respectively.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism including a gear case defining an axis of rotation and a gear chamber, differential gearing disposed in said gear chamber including at least one input gear and an output gear adapted to drive an axle shaft, means operable to limit rotation of said output gear relative to said gear case, said means operable to limit rotation comprising a clutch housing, fixed relative to said gear case, a coupling means disposed adjacent said output gear and disposed to be concentric about said axis of rotation, said means operable to limit rotation further comprising a clutch pack including at least one outer friction disc fixed to rotate with said clutch housing and at least one inner friction disc fixed to rotate with said coupling means; a fluid pump disposed axially outboard of said clutch pack and comprising an inner rotor adapted to be driven by said axle shaft; said output gear defining a first set of internal splines, and said inner rotor defining a second set of internal splines, and said axle shaft defining a mating set of external splines, characterized by:

(a) said axle shaft defining an annular groove and a retention ring disposed within said annular groove;
    (b) said annular groove and said retention ring being disposed at an axial location on said axle shaft such that during insertion of said axle shaft, said set of external splines passes through said second set of internal splines, and passes into engagement with said first set of internal splines before said retention ring engages said second set of internal splines, and is collapsed radially inwardly by passing through said second set of internal splines; and
    (c) said retention ring being permitted to expand radially outward as it exits said second set of internal splines, said retention ring remaining disposed immediately inboard of said second set of internal splines to prevent movement, except in response to at least a predetermined axial force of said axle shaft in an outboard direction.

2. A differential gear mechanism as claimed in claim 1, characterized by said fluid pump comprising a fixed axis type of gerotor gear set, including an eccentric housing portion an internally-toothed outer rotor rotatably disposed within said eccentric housing portion, and said inner rotor being externally-toothed and in toothed engagement with said outer rotor, whereby rotation of said axle shaft relative to said clutch housing results in pumping pressurized fluid.

3. A differential gear mechanism as claimed in claim 1, characterized by said second set of internal splines having an outboard end defining an angle X relative to said axis of rotation, and having an inboard end defining an angle Y relative to said axis of rotation, said angle Y being greater than said angle X whereby, a greater axial force is required to move said axle shaft in an outboard direction, collapsing said retention ring, from an assembled position than is required to move said axle shaft in an inboard direction, collapsing said retention ring, to said assembled position.

4. A differential gear mechanism including a gear case defining an axis of rotation and a gear chamber, differential gearing disposed in said gear chamber including at least one input gear and an output gear adapted to drive an axle shaft, means operable to limit rotation of said output gear relative to said gear case, said means comprising a clutch housing, fixed relative to said gear case, a coupling member disposed adjacent said output gear and disposed to be concentric about said axis of rotation, said means operable to limit rotation further comprising a clutch pack including at least one outer friction disc fixed to rotate with said clutch housing and at least one inner friction disc fixed to rotate with said coupling member; a fluid pump disposed axially outboard of said clutch pack and comprising an inner rotor) adapted to be driven by said axle shaft; said output gear defining a first set of internal splines, said coupling member defining a second set of internal splines, and said inner rotor defining a third set of internal splines, and said axle shaft defining a mating set of external splines, characterized by:

(a) said axle shaft defining an annular groove and a retention ring disposed within said annular groove;

(b) said annular groove and said retention ring being disposed at an axial location on said axle shaft such that during insertion of said axle shaft, said set of external splines passes through said third set of internal splines, then through said second set of internal splines and passes into engagement with said first set of internal splines before said retention ring engages said third set of internal splines, and is collapsed radially inwardly by passing through said third set of internal splines; and (c) said retention ring being permitted to expand radially outward as it exits said third set of internal splines, said retention ring remaining disposed immediately inboard of said third set of internal splines to prevent movement, except in response to at least a predetermined axial force of said axle shaft in an outboard direction.

5. A differential gear mechanism as claimed in claim 4, characterized by said gear case defining a wall portion disposed between said output gear and said clutch pack, whereby gear reaction forces which occur during differentiation within said differential gearing are not transmitted from said output gear to said clutch pack.

6. A differential gear mechanism as claimed in claim 4, characterized by said clutch housing defining a clutch piston chamber disposed adjacent said clutch pack and a clutch apply piston disposed within said clutch piston chamber and operable to exert a clutch loading force on said clutch pack in response to fluid pressure being communicated to said clutch piston chamber.

7. A differential gear mechanism as claimed in claim 4, characterized by said first set of internal splines, said second set of internal splines, and said third set of internal splines all being substantially identical to each other.

8. A differential gear mechanism as claimed in claim 4, characterized by said third set of internal splines having an outboard end defining an angle X relative to said axis of rotation, and having an inboard end defining an angle Y relative to said axis of rotation, said angle Y being greater than said angle X whereby, a greater axial force is required to move said axle shaft in an outboard direction, collapsing said retention ring, from an assembled position than is required to move said axle shaft in an inboard direction, collapsing said retention ring, to said assembled position.

9. A method of assembling a differential gear mechanism including a gear case defining an axis of rotation and a gear chamber, differential gearing disposed in said gear chamber including at least one input gear and an output gear adapted to drive an axle shaft, means operable to limit rotation of said output gear relative to said gear case, said means comprising a clutch housing, fixed relative to said gear case, a coupling means disposed adjacent said output gear and disposed to be concentric about said axis of rotation, said means operable to limit rotation further comprising a clutch pack including at least one outer friction disc fixed to rotate with said clutch housing and at lest one inner friction disc fixed to rotate with said coupling means; a fluid pump disposed axially outboard of said clutch pack and comprising an inner rotor; said output gear defining a first set of internal splines, one of said coupling means and said inner rotor defining a second set of internal splines, and said axle shaft defining a mating set of external splines, said method of assembling said differential gear mechanism comprising the steps of:

(a) providing said axle shaft with an annular groove and inserting in said annular groove a collapsible and expandable retention ring;

(b) inserting a leading end of said external splines of said axle shaft into and through said second set of internal splines until said external splines engage said first set of internal splines;

(c) rotating said axle shaft until said set of external splines are received within said first set of internal splines;

(d) moving said axle shaft axially inboard until said retention ring engages an outboard end of said second set of internal splines; and (e) exerting sufficient axial force on said axle shaft to collapse said retention ring, and move said axle shaft axially further inboard until said retention ring is past said second set of internal splines, allowing said retention ring to expand and engage an inboard end of said second set of internal splines, thus preventing movement of said axle shaft in an axially outboard direction.

10. A method of assembling a differential gear mechanism as claimed in claim 9, characterized by the further step of providing said second set of internal splines having an outboard end defining an angle X relative to said axis of rotation, and having an inboard end defining an angle Y relative to said axis of rotation, said angle Y being greater than said angle X whereby, a greater axial force is required to move said axle shaft in an outboard direction, collapsing said retention ring, from an assembled position than is required to move said axle shaft in an inboard direction, collapsing said retention ring, to said assembled position.

* * * * *